Figure 1:
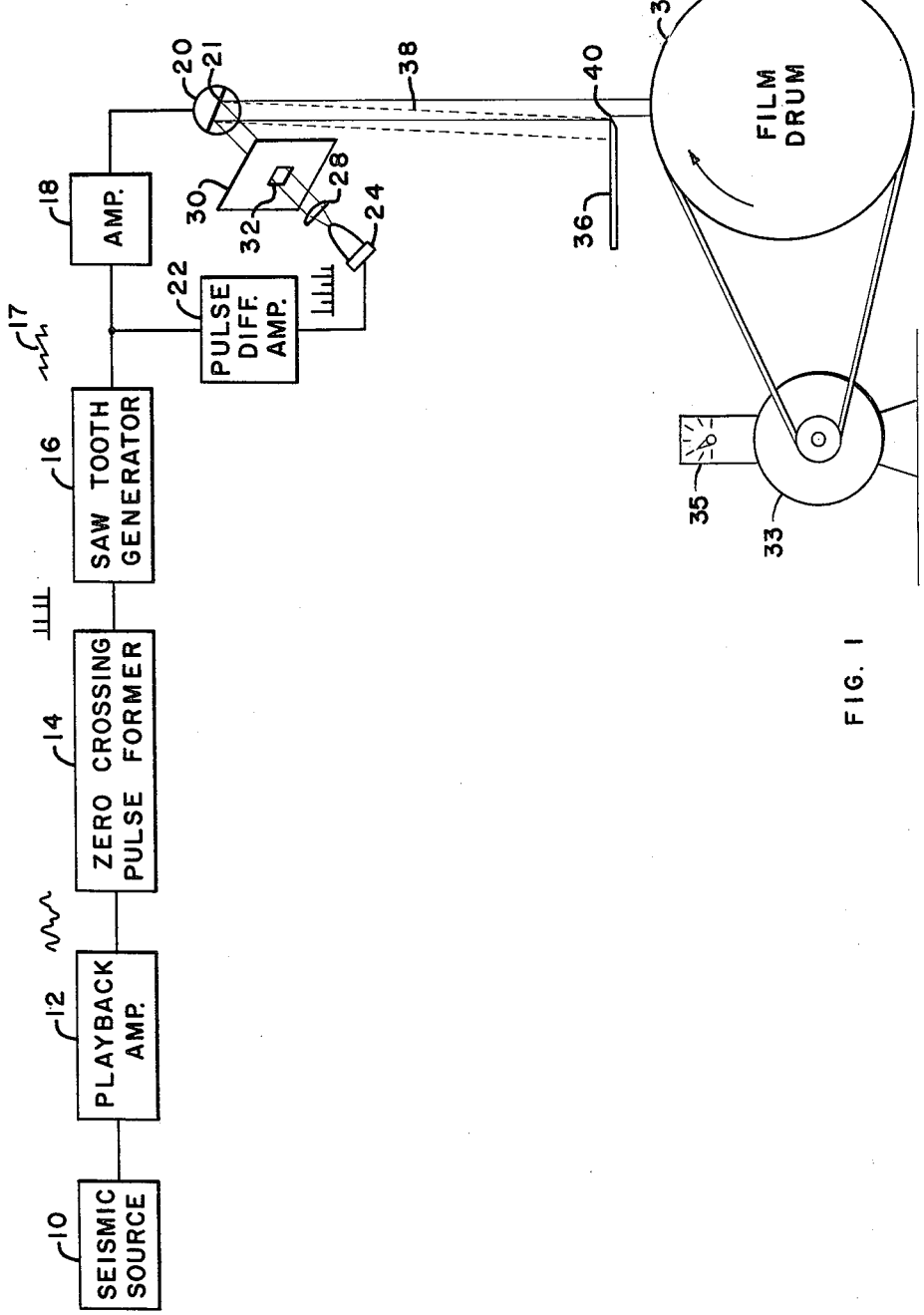

United States Patent Office 3,072,906
Patented Jan. 8, 1963

3,072,906
SEISMIC RECORDING SYSTEM
Philip S. Williams, Tulsa, Okla., assignor to Jersey Production Research Company, a corporation of Delaware
Filed Sept. 15, 1958, Ser. No. 760,933
17 Claims. (Cl. 346—1)

The present invention concerns an improvement in systems for recording seismic signals. The invention especially pertains to a seismic recording system which makes use of frequency information of the seismic signals. It particularly relates to a system for presentation of seismic information wherein frequency variations of seismic signals are automatically determined and recorded in variable density form.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. The waves continue to travel downward within the earth, until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated to electrical impulses which are then indicative of the character of the ground motion and are usually referred to collectively as a seismic signal which is in effect a composite signal made up of a plurality of electrical signals varying in frequency and amplitude. The electrical signals oscillate by a no-signal, zero voltage, quiescent point or a record base line.

The usual practice has been to examine the amplitude characteristics of the recordings made of the seismic signals by correlating the amplitudes of a plurality of traces on a seismic record. Seismic observers can by observing such traces determine the shape of reflected subsurface formations. By accurately recording the time required for the seismic waves to travel to the reflection surfaces and return to the geophones, it is possible to determine the depths to such reflection surfaces.

In the past it has been the general practice to amplify the seismic signals generated by geophone and to record the signal by means of a suitable camera. The camera may take the form of a recording oscillograph or as is more recently the case it may take the form of a magnetic or photographic recording device capable of recording the signal in reproducible form. It is this amplified record signal with which seismic computers make their study.

Most conventional seismographs—that is, devices for recording the seismic signals—are capable of recording up to 24 or more separate seismic signals simultaneously. Thus, if a seismic observation results in 24 seismic signals being generated at as man detection stations, the resulting seismogram is a 24-trace record of the resulting 24 signals. The traces are usually arranged in a side-by-side relationship, and a timing trace indicating predetermined time intervals is simultaneously recorded with the seismic signals to indicate the elapsed time after the shot to any point on each trace. Once a seismogram has been made persons skilled in the art are generally able to determine from the data recorded on the seismogram certain characteristics of the earth's substrata in the vicinity of the seismic observation.

The accuracy of exploration by seismic methods depends to a large extent upon the ability of an observer to analyze recorded seismic information. It has been found that variable density records in which the signal is reproduced as a photographic trace which varies in density along its length in proportion to the intensity of the signal are more easily analyzed than other types of records.

There are various known means of producing variable density photographic records. One such system is described in U.S. Patent No. 2,769,683, patented November 6, 1956, entitled "Variable Density Recording of Galvanometer Motion," by Jesse D. Skelton. However, known variable density methods of recording seismic information do not readily reflect changes in the frequency of the recorded seismic signal. This shortcoming has developed into a disadvantage inasmuch as it has now been observed that changes in record frequency—that is, frequency of the seismic signal—are related to subsurface conditions which may have a bearing on petroleum or other mineral exploration. It is accordingly one of the objects of this invention to provide a system in which the frequencies of the seismic signals are recorded in a variable density form.

The overall or average frequency of the record is influenced by, among other things, attenuation of the seismic signal in a subsurface formation. High frequencies are attenuated more than low frequencies, so that the recorded frequency tends to diminish with increasing time after the shot; i.e., as received waves will have travelled farther. Since this effect varies from one earth material to another, a change in frequency or record may indicate a transition from one type of material to another—i.e., from a shale-sand sequence to limestone. This effect may also show up if the change in frequency in a particular depth section goes from record to record on a line which may indicate a lateral change in lithology in a section.

A reflection or group of reflections may constitute a "frequency anomaly" in the record relative to the "background" frequency before and after. This may come about because the so-called background is made up of waves having a different nature and travel path from the reflection and hence a different frequency. It may also come about because the apparent frequency of a complex of two or more primary reflections is influenced by the strength and spacing of the subsurface discontinuities from which they come.

An object of this invention then is to facilitate the study and use of seismic frequency variations as an aid to the understanding of subsurface structure and stratigraphy.

Preferably, this invention includes a system which presents seismic data in section form in a manner emphasizing frequency variations in a way which utilizes the normal shades of gray between white and black. Each half cycle is preferably used to control both the shade of gray recorded and the area of gray recorded for that particular half cycle. In other words, the distance between the zero crossings are used to determine (1) the area to be exposed on a photosensitive medium and (2) the intensity of the exposure.

Briefly, this invention includes a system in which zero crossings of seismic signals are detected and the frequency of the occurrences of these zero crossings are displayed in a manner to present frequency variations in a variable density presentation.

At this point it is well to note that several terms in this description are assumed to have the following meaning. Thus the term "frequency" is meant to be the number of times of the signal waveform or seismic signal crosses the zero signal axis per unit of time. The term "zero crossing" refers to the crossing of the zero signal axis by the signal waveform. The term "positive zero crossing" refers to the crossing of the zero signal axis by the signal waveform in which the waveform changes from a negative to a positive value and the term "negative zero crossing" refers to the crossing of zero signal axis where the seismic signal changes from a positive to a negative value.

Figure 2:
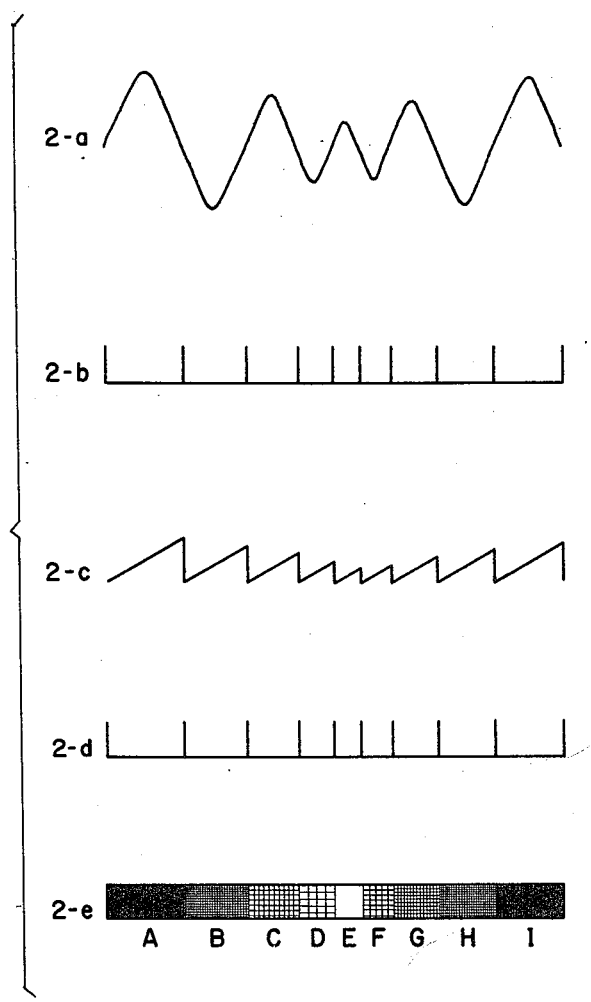

Other objects and a fuller understanding of this invention may be had by referring to the following description and claims taken in conjunction with the accompanying drawing in which:

FIG. 1 illustrates in block diagram form an electronic system which can be utilized in the practice of this invention; and FIG. 2 is a graphic representation illustrating a comparison between a primary electrical signal 2–a of the original seismic wave, intermediate wave 2–b, sawtooth wave 2–c, variable amplitude pulses 2–d, and variable density recording 2–e.

Referring to the drawing, it may be seen that the components shown in this diagram include a seismic signal source 10, an amplifier 12, a zero crossing pulse former 14, a sawtooth generator 16, and an amplifier 18 which is electrically connected to galvanometer 20.

Referring to the drawing, it will be seen that numeral 10 refers to a seismic signal source. This source will most commonly be a magnetic tape on which a seismic signal, which has been detected by a geophone, has been recorded. The seismic source may include any reproducible recorded seismic signal or it may include a signal received direct from the geophone which is used to detect the seismic disturbance.

The seismic source is electrically connected to a playback amplifier 12 which amplifies the signal. The output from the playback amplifier is electrically connected to zero crossing pulse former 14 which is of a character to generate a sharp positive pulse for each zero crossing of the seismic signal. The output signal from the zero crossing pulse former 14 is electrically connected to sawtooth generator 16. For a discussion of different ways of selecting zero crossings, reference is made to pages 348–358, inclusive, of Waveforms by Chance, Hughes, MacNichol, Sayre, and Williams, published by McGraw-Hill Book Company, Inc., New York, New York. Sawtooth generator 16 is of a type to produce a linearly rising voltage upon receiving a pulse from zero crossing pulse former 14. The pulse also resets the sawtooth generator to zero voltage as well as triggering its next rise. The output of sawtooth generator 16 is electrically connected to amplifier 18 and pulse differentiator amplifier 22. Amplifier 18 is preferably one that has adjustable gain. Amplifier 18 is electrically connected to galvanometer 20 which is a high frequency response galvanometer and has a frequency sensitivity considerably higher than the frequency of the occurrence of the sawteeth in the sawtooth waveform generated by sawtooth generator 16. In other words, the rotational position of the mirror of galvanometer 20 closely follows and is at all times indicative of the instantaneous value of the sawtooth waveform.

Pulse differentiator amplifier 22 is electrically connected to the output of sawtooth generator 16. Pulse differentiator amplifier 22 is of a character to generate an output waveform which is a series of sharp positive pulses with each pulse occurring at the occurrence of the peak of the sawtooth signal 2–c illustrated in FIG. 2 and generated by sawtooth generator 16. These pulses vary in amplitude as the amplitude of the various teeth or peaks of the sawtooth signal. For a discussion of differentiation amplifiers, reference is directed to pages 460–462 of Reference Data for Radio Engineers, fourth edition, International Telephone and Telegraph Corporation, 67 Broad Street, New York 4, New York. The output of pulse differentiator amplifier 22 is fed to a variable intensity flash tube 24 which has a spot source of light and which may be a tube such as that manufactured by Sylvania Electric Products, Inc., and designated R1131C Glow Tube.

The light flash from glow tube 24 preferably passes through a condensing lens 28 which directs the light rays in substantially parallel paths parallel to the plane of the paper. A light barrier 30, substantially normal to the plane of the paper, with aperture 32 is provided to control the cross-sectional area and shape thereof of the light beam from glow tube 24 which is directed toward the mirror of galvanometer 20. The axis of rotation of the mirror of galvanometer 20 is substantially parallel to the plane of the paper. Aperture 32 is preferably rectangular in shape.

Recording drum 34 is positioned with its axis of rotation essentially parallel to the axis of rotation of the mirror of galvanometer 20. Recording drum 34 is driven by adjustable speed motor 33 which has adjustable means 35. A light shield 36 is positioned between the galvanometer 20 and recording drum 34. A photosensitive medium is conveniently placed upon drum 34. It is of course understood that means other than a film drum may be used for passing a recording medium past the light source. Any means may be used which will feed the recording medium past the image point at a desired speed.

Shield 36 is so positioned that when the mirror of galvanometer 20 is in its at-rest position, that is, when it is in the position which it would be when receiving a minimum or zero voltage from the sawtooth signal, shield 36 would block all of the light beam reflected from the mirror of galvanometer 20, and of course none of the light would reach the recording medium on drum 34. When the galvanometer is in its at-rest position, the leading edge of a flash path or reflected light from the mirror of galvanometer 20 if light tube 24 were lighted, as illustrated by dotted line 38, would be even with the leading edge of shield 36 as indicated at 40. Rotation of recording drum 34 is synchronized with the rotation of mirror of galvanometer 20 as it follows the rising voltage ramp from its at-rest position. That is, the speed of a point on the periphery of drum 34 is essentially equal to the speed of the flash path on the periphery of the drum 34. The "flash path" may be considered the path or sweep that light reflected from mirror galvanometer 20 would travel if light source 20 remains on during the rotation of the mirror of galvanometer 20 from its at-rest position to the peak of each ramp of sawtooth signal 17. Drum 34 is preferably continuously rotated at a uniform speed. As will be more clearly seen, proper timing of the speed of rotation of the galvanometer and drum is important as it provides for a substantially continuous, but not overlapping, variable density record to be made on the recording medium.

Attention will now be directed especially toward FIG. 2 and the operation of the apparatus as illustrated in FIG. 1. A seismic signal, illustrated in FIG. 2–a, from seismic source 10 is fed through playback amplifier 12 and the amplified signal is then fed to zero crossing pulse former 14. Zero crossing pulse former 14 has a series of equal amplitude spikes illustrated in FIG. 2–b which occur at the zero crossings of the seismic signal. In other words, for each zero crossing of the seismic signal a positive spike or pulse is generated. Each positive pulse triggers a linearly rising voltage ramp from sawtooth generator 16. The ramp continues to rise linearly until the sawtooth generator receives the next succeeding pulse which resets the generator voltage to zero and again triggers its upward rise.

It is thus seen that each zero crossing of the seismic signal triggers a linearly rising voltage ramp which continues to rise until the next zero crossing pulse resets the ramp voltage to zero and again triggers its upward rise to the next seismic trace half cycle. The sawtooth signal is illustrated in FIG. 2–c. The sawtooth signal is amplified and is used to drive galvanometer 20. Galvanometer 20 is of such frequency sensitivity that the rotation of its mirror closely follows the sawtooth signal. In other words, the position of the mirror of the galvanometer 20 is at all times directly representative of the sawtooth curve. When the sawtooth signal is at zero, the mirror is in its at-rest position and the rotation of mirror of galvanometer 20 from its at-rest position is at all times proportional to the amplitude of the sawtooth signal. It is noted however, that there is a very small mechanical lag in the rotational position of the mirror and the sawtooth waveform. As will be seen this mechanical lag is used to good advantage in displaying the sawtooth signal.

The speed of rotation of galvanometer 20, as it follows the linear ramps of sawtooth signal 2–c, is synchronized with the speed of rotation of drum 34. The speed of a point on the periphery of drum 34 is the same as the speed of a point on the periphery of an arc formed by the rotation of a radius fixed prependicular to the axis of the mirror of galvanometer 20 and with the axis of rotation of the mirror being the pivot point of the radius and the radius being equal in length to the distance between the axis of rotation of the mirror and the periphery of the drum 34. The ratio of the angular rotation of drum 34 to the angular rotation of mirror of galvanometer 20 is substantially equal to twice the ratio of the radius of drum 34 to the distance of the center of rotation of the mirror and the periphery of drum 34. The synchronizing of the speed of rotation of galvanometer mirror 21 with the speed of drum 34 may be determined mathematically. However, synchronization is normally conveniently accomplished experimentally. This is conveniently done by first setting the speed of rotation of drum 34 and the speed of rotation of galvanometer mirror 21, either at some arbitrary speed or in approximate calculated synchronization. The device is started and a film exposed. If there are gaps between the exposed areas on the film, the galvanometer is traveling too slowly with respect to the drum or film speed; if the areas exposed overlap, then the galvanometer is rotating too fast. The speed of the galvanometer is then adjusted by varying the amplification of the signal which is fed to the galvanometer to either speed up or slow down the rotation of the galvanometer as needed. This checking and adjusting is repeated until the exposed areas are linearly adjacent with no overlapping or gaps therebetween. The speed of rotation of drum 34 can be adjusted to obtain synchronisation; however, it is normally preferred to adjust the speed of rotation of the galvanometer.

The output signal from sawtooth generator 16 is fed to a pulse differentiator amplifier 22 which generates a sharp positive pulse, as illustrated in FIG. 2–d, for each peak of sawtooth signal 2–c which is proportional in amplitude to the amplitude of the peak of the sawtooth signal. In other words, the output of pulse differentiator amplifier 22 is a waveform which comprises a positive pulse for each zero crossing of the original seismic signal with the amplitude of the pulses being proportional to the time between zero crossings. Light source 24 is energized for each pulse it receives from pulse differentiator amplifier 22. The intensity of the flash is proportional to the amplitude of the pulse received. The light flash from spot light source 24 is passed through lens 28 which focuses the light rays in a parallel path and directs a beam toward the surface of the galvanometer mirror. The light from lens 28 passes through aperture 32. It is thus seen that lens 28 serves to direct a uniform light of parallel rays through aperture 32 toward the mirror of galvanometer 20; and aperture 32 aids in shaping the uniform light into the desired cross-sectional area.

When light source 24 flashes, a rectangular beam of light passes through aperture 32 to mirror 21. This beam is reflected by mirror 21 with a portion of the image reflected by mirror 21 falling upon barrier 36, and a portion of the reflected image falling upon the light recording medium placed upon drum 34. The amount of the image which is reflected upon the photographic film and the intensity of the flash of light are both directly proportional to the instantaneous amplitude of the sawtooth signal. This instantaneous amplitude is directly proportional to the time between zero crossings. The mirror has a very small mechanical lag. Therefore at the instant the light flashes, the galvanometer is still at a rotational position representative of the peak of the sawtooth. Therefore the amount of the image that falls upon the recording medium is proportional to the instantaneous amplitude of the sawtooth signal.

The speed of the recording medium and the rotation of mirror 21 are synchronized. Therefore the area exposed by each flash is always adjacent to, but does not overlap, the prior exposed area.

FIG. 2–e illustrates a variable density presentation of a portion of a seismic signal. It is seen that there are sections A through I, inclusive. Each section is rectangular in shape with its size and density being representative of the frequency of the seismic signal. The sections vary in density from black at A through gray at B and to white at E. It is seen that there is essentially a continuous image recorded on a photographic strip; that is, there is no area between the various sections illustrated thereon. This is so since the speed of the recording medium is the same as the speed of the image reflected from mirror 21 at the point it strikes the recording medium. When the ramp voltage of sawtooth signal 2–c drops to zero, mirror 21 returns almost instantaneously to its at-rest position and as the next succeeding ramp of the sawtooth signal begins to rise, mirror 21 likewise rotates so that the projection of a potential light image from mirror 21 is moving at the same speed as the periphery of drum 34 and is immediately behind and adjacent the previous image which has been recorded.

The most commonly occurring frequencies in seismic signals are from about 10 to 100 cycles per second. However, it is in the range of about 25 to 80 cycles per second in which frequency information is normally of the greatest interest. It is of course understood that the frequency range of interest may vary from area to area. For example, the various electronic components, the flash tube and the photographic film may be so designed that a frequency of about 80 cycles per second will give a density on the film of white, while a frequency of about 25 cycles per second will give a density of black. Any frequency between these maximums and minimums will give varied degrees of intensity from white to black in proportion to the frequency involved. Higher frequencies above 80 cycles per second will produce white and all those below 25 cycles per second will produce a black intensity. By way of illustration, section A in FIG. 2e may be representative of 25 cycles per second and section E representative of 80 cycles per second. An intermediate frequency of about 50 cycles per second may be illustrated by section G. It is thus seen that FIG. 1–e illustrates a variable density presentation which varies in accordance with the variations in frequency. It is also clear that (1) the area and (2) the intensity of each exposure, as illustrated by sections A, B, etc., of the presentation are proportional to the time between zero crossings, or to the reciprocal of the frequency.

It is seen that a seismic section presented in a variable density form may be prepared by using this invention. Individual signals, presented in a variable density form, are commonly arranged in the same lateral order as the geophone locations corresponding to the seismic signals. The spacing between the variable density presentation of the seismic signals is preferably proportional to the distance between the geophone locations so as to render the final products a reasonably accurate map of a vertical cross-section of the portion of the earth under study. If the spacing between the center of the variable density presentations of the signals is increased, the width of the presentation is accordingly increased. This prevents blank spaces from appearing on the seismic section. It is thus seen that a seismic section can be prepared in a manner such that frequency variations within the seismic spectrum are readily apparent.

It will be understood that the apparatus and system contained in the above description are merely representative and illustrative and not limited and that numerous modifications may be made therein without departing from the scope of the invention.

The invention claimed is:

1. A method of recording a seismic signal having zero crossings of voltages with respect to time about a zero reference line which comprises detecting such zero crossings; recording the time between successive zero crossings as independent intervals; and varying the density and the size of each interval as a function of the total time between successive zero crossings of said seismic signal.

2. A method of recording a seismic signal which oscillates about a zero voltage reference line with variable time between zero crossings which comprises detecting the negative zero crossings; recording the time between successive negative zero crossings as independent intervals and varying each independent interval in size and in density according to the time between said negative zero crossings.

3. A method of recording in variable density form a seismic signal which oscillates by a zero voltage base line with variable time between zero crossings which comprises detecting zero crossings; successively exposing linearly adjacent areas of a photosensitive recording medium and varying the size of the area exposed and the degree of exposure as a function of the time between said zero crossings.

4. A method of recording a seismic signal having voltage changes from positive to negative and negative to positive which comprises detecting the positive zero crossings; recording the time between successive positive zero crossings as independent intervals and varying the size and the density of each interval as a function of the total time between successive positive zero crossings of said seismic signal.

5. A method of recording a seismic signal which oscillates by a zero base line in which the time between the zero crossing varies which comprises detecting the negative zero crossings; recording the time between successive negative zero crossings as an independent interval on a recording medium, and controlling the optical character of the interval according to the time between said negative zero crossings and linearly aligning said independent intervals in the same order as the time which the interval represents.

6. An apparatus for recording an electrical signal oscillating by a zero voltage base line with the time between zero crossings of said zero base line varying which comprises in combination a reflecting mirror galvanometer, means rotationally responsive to the time between said zero crossings with said mirror returning to an at-rest position at each zero crossing; a light source of a character to emit a flash of light at each zero crossing with the intensity of the light flash being proportional to the time between zero crossings; a light barrier provided with an aperture; a recording medium spaced from said mirror; a light shield between said recording medium and said mirror with said shield positioned to block all the projection of the image of said light source reflected from said mirror from said recording medium only when said mirror is in its at-rest position; means capable of moving said recording medium at a speed equal to the speed on said recording medium of the projection of said light source's image reflection from said mirror, said light barrier being disposed between said reflecting mirror and said light source and arranged such that light from said light source passes through said aperture and is reflected by said mirror to form a rectangular light area on the shield when said mirror is in its at-rest position and when said mirror rotates from its at-rest position and the amount of light blocked by said shield is progressively less as said mirror rotates from its at rest position whereby the amount of recording medium exposed and the intensity of the exposure is dependent upon the time between said zero crossings.

7. An apparatus for making a photographic record of an electrical transient which oscillates about a zero base line and having variable spaced zero crossings which comprises in combination a source of light capable of emitting a rectangular area of light whose intensity and occurrence are responsive to the rate of occurrence of said zero crossings; a reflecting mirror galvanometer rotatable in one direction from an at-rest position with its mirror rotational responsive to the rate of occurrence of said zero crossings; a light shield positioned to receive all of the projection of the reflection of the image of said rectangular light source only when said mirror is in its at-rest position; a photo-sensitive recording medium positioned adjacent said shield such that when said mirror is rotated from its at-rest position the amount of said projection projected to the light-sensitive medium is proportional to the rotation of said mirror from said at-rest position; means for moving the said recording medium by said barrier; and means for adjusting the rotation of said mirror and speed of said medium such that the speed of the medium is equal to the speed of the projection of the image of said light source from said mirror at said medium.

8. An apparatus for making a photographic record of an electrical transient which oscillates back and forth across a zero base line and having variable spaced zero crossings which comprises in combination means for generating a sawtooth signal having a maximum at each zero crossing whose amplitude is proportional to the rate of occurrences of said zero crossings and with said signal reset to a zero position and triggered to a linearly rising voltage at each said crossing, a reflecting mirror galvanometer whose mirror is rotationally responsive to said sawtooth signal with said mirror having an extreme position for each zero crossing; a light barrier having a rectangular aperture, an intermittent variable intensity light source capable of directing light through said aperture and upon said mirror with said light source emitting a beam of light at each maximum of said sawtooth signal with the intensity of said light beam depending upon the amplitude of said maximums; a photosensitive medium spaced from said mirror; a light shield positioned adjacent said photosensitive medium and arranged with the projection of the reflection of said rectangular aperture being completely upon said second barrier when said mirror is in its extreme position and as said mirror rotates, a linearly increasing amount of said projection is projected by said barrier and onto said medium; and means capable of moving said medium synchronized with said mirror such that the speed of said medium is the same as the rotational speed of said projection at said medium.

9. An apparatus for recording a seismic signal oscillating by a zero voltage base line with the time between the zero crossings of said signal varying which comprises in combination a light source of a character to emit a flash of light at each zero crossing with the intensity of the light flash being proportional to the time between zero crossings; means for generating a signal having a linearly rising voltage which is reset to a zero value for each zero crossing of said signal; a reflecting mirror galvanometer rotationally responsive to said generated signal with the mirror of said galvanometer returning to an at-rest position for each zero value of said generated signal; an apertured light barrier; a recording medium spaced from said mirror galvanometer; a light shield between said recording medium and said mirror, a light barrier being positioned between said reflecting mirror and said light source and arranged such that light from said light source passes through said aperture and is reflected by said mirror to form a lighted area on said shield when said mirror is in its at-rest position and when said mirror rotates from its at-rest position the amount of reflected light passing by said shield linearly increases with the rotation of said mirror, means capable of moving said recording medium by said shield such that the speed of said medium is the same as the flash path of said light source on said medium whereby the area and the intensity of each exposure of said medium is dependent upon the time between said zero crossings.

10. A method of recording in variable density form a seismic signal which oscillates by a reference voltage base line with variable time intervals between the crossings of said base line which comprises: detecting the crossings; recording the time interval between successive crossings as independent areas on a recording medium, and controlling the size and density of each such area according to the time between said crossings.

11. A system for recording in variable density form on a recording medium a seismic signal which oscillates by a reference voltage base line with variable time between successive crossings in said base line comprising in combination: means to detect the occurrence of such crossings, measuring means to measure the time interval between the occurrence of such crossings, recording means for recording the time between successive crossings as independent areas on said recording medium, means responsive to said measuring means to control the size of each such area; and means to control the density of each such area according to the time between said crossings.

12. A system for recording in variable density form on a recording medium a seismic signal which has variable time intervals between detectable significant points which comprises: means to detect the occurrence of such significant points; means to expose individual areas of uniform width on said medium; and means for varying the size of each of the individual areas exposed and the density of each such area as functions of the time between successive significant points.

13. A system as defined in claim 12 with the improvement of providing means for exposing the areas as linearly adjacent areas.

14. A method of recording in variable density form a seismic signal which has variable time intervals between successive detectable characteristics which comprises: detecting the occurrence of such characteristics; determining the time between the ocurrence of such characteristics; successively exposing independent areas of a recording medium; controlling the size of each such area according to the time between said characteristics; and controlling the visible character of each such area as a function of the time between said characteristics.

15. A system of recording on a recording medium a seismic signal which has variable time intervals between detectable significant points which comprises: means to detect such points; second means to measure the time interval between such points; a recording head means; a recording medium; means to provide relative movement between said recording head means and said recording medium; means responsive to the measured time interval to control the size of individual areas recorded upon said medium; and means responsive to the measured time interval to control the optical characteristics of the recording of each such individual area.

16. A system as defined in claim 15 with the improvement of providing means for recording the individual areas as linearly adjacent areas.

17. A method of recording in variable density form a seismic signal which has variable time intervals between successive detectable characteristics which comprises: detecting the desired detectable characteristics; measuring the time intervals between the occurrences of the characteristics; exposing individual areas of a moving recording medium; controlling the size of each such area according to the measured time intervals; controlling the optical character of the exposure according to the measured time interval.

References Cited in the file of this patent

UNITED STATES PATENTS

| | | |
|---|---|---|
| 1,862,327 | Bagno | June 7, 1932 |
| 2,467,950 | Thompson | Apr. 19, 1949 |
| 2,767,388 | Rust | Oct. 16, 1956 |
| 2,791,288 | Meier | May 7, 1957 |
| 2,875,017 | Reynolds | Feb. 24, 1959 |
| 2,912,673 | Groenendyke | Nov. 10, 1959 |
| 3,008,792 | Cox | Nov. 14, 1961 |

FOREIGN PATENTS

| | | |
|---|---|---|
| 1,031,007 | Germany | May 29, 1958 |